United States Patent
Andersen et al.

(10) Patent No.: US 8,554,526 B2
(45) Date of Patent: Oct. 8, 2013

(54) SYSTEM AND METHOD FOR PHYSICS INTERACTIONS IN A SIMULATION

(75) Inventors: Jens Andersen, Austin, TX (US); Drew Powers, Cedar Park, TX (US)

(73) Assignee: Sony Online Entertainment LLC, San Diego, CA (US)

( * ) Notice: Subject to any disclaimer, the term of this patent is extended or adjusted under 35 U.S.C. 154(b) by 365 days.

(21) Appl. No.: 12/507,628

(22) Filed: Jul. 22, 2009

(65) Prior Publication Data

US 2010/0029384 A1   Feb. 4, 2010

Related U.S. Application Data

(60) Provisional application No. 61/082,679, filed on Jul. 22, 2008.

(51) Int. Cl.
| | | |
|---|---|---|
| G06G 7/48 | (2006.01) |
| A63F 9/24 | (2006.01) |
| A63F 13/00 | (2006.01) |
| G06F 17/00 | (2006.01) |
| G06F 19/00 | (2011.01) |
| G06T 17/00 | (2006.01) |
| G09G 5/00 | (2006.01) |

(52) U.S. Cl.
USPC ............... 703/6; 463/32; 463/43; 345/420; 345/653

(58) Field of Classification Search
USPC ............... 703/6; 463/32, 43; 345/420, 653
See application file for complete search history.

(56) References Cited

U.S. PATENT DOCUMENTS

| | | | |
|---|---|---|---|
| 5,377,997 A | 1/1995 | Wilden et al. | |
| 5,498,003 A | 3/1996 | Gechter | |
| 7,403,202 B1 * | 7/2008 | Nash | 345/474 |
| 2005/0253840 A1 * | 11/2005 | Kwon | 345/419 |
| 2006/0149516 A1 * | 7/2006 | Bond et al. | 703/6 |
| 2006/0221081 A1 | 10/2006 | Cohen et al. | |

(Continued)

FOREIGN PATENT DOCUMENTS

| | | |
|---|---|---|
| GB | 2444516 | 11/2011 |
| JP | 2004-220273 | 8/2004 |

(Continued)

OTHER PUBLICATIONS

Jorissen, Pieter et al., "Dynamic Interactions in Physically Realistic Collaborative Virtual Environments", Nov./Dec. 2005, IEEE Transactions on Visualization and Computer Graphics, vol. 11, No. 6.*

(Continued)

*Primary Examiner* — Kamini S Shah
*Assistant Examiner* — Cedric D Johnson
(74) *Attorney, Agent, or Firm* — Mark D. Wieczorek; Mayer & Williams PC

(57) ABSTRACT

Systems and methods are provided to implement a technique for managing physics interactions in a computer simulation, such as the interactions of objects in an online computer game. Objects in the simulation are or can become physics objects that then behave according to the rules of the physics simulator in operation. Different implementations can use different rules for how items become physics objects and for what rules are used to manage physics objects. Since physics object interactions are determined on the basis of their physical properties rather than adherence to predefined interactions, the resulting interactions are emergent and not scripted.

24 Claims, 6 Drawing Sheets

(56) References Cited

U.S. PATENT DOCUMENTS

| | | | |
|---|---|---|---|
| 2007/0066403 A1 | 3/2007 | Conkwright | |
| 2007/0156294 A1* | 7/2007 | Tipping et al. | 701/1 |
| 2007/0260567 A1 | 11/2007 | Funge et al. | |
| 2008/0026838 A1 | 1/2008 | Dunstan et al. | |
| 2008/0133652 A1 | 6/2008 | Richards | |
| 2009/0143124 A1* | 6/2009 | Hughes et al. | 463/2 |

FOREIGN PATENT DOCUMENTS

| | | |
|---|---|---|
| JP | 2007-272267 | 10/2007 |
| JP | 2008-079748 | 4/2008 |
| KR | 1020060066575 | 6/2006 |

OTHER PUBLICATIONS

Fox, Daniel, "Demolishing Objects in Computer Games", May 2003.*

Sang, Robert, "Materials Based Physics for 3D Games", Oct. 31, 2004, School of Computing and Mathematical Sciences, Liverpool John Moores University.*

Seugling, Axel et al., "Evaluation of Physics Engines and Implementation of a Physics Module in a 3d-Authoring Tool", Mar. 6, 2006, Department of Computing Science, Umea University, Sweden.*

Raghuvanshi, Nikunj et al., "Real-Time Sound Synthesis and Propagation for Games", Jul. 2007, ACM, vol. 50, No. 7.*

Lugrin, Jean-Luc et al., "Artificial Intelligence-Mediated Interaction in Virtual Reality Art", 2006, IEEE Computer Society.*

Barrow, Alastair et al., "A Dynami Virtual Environment for Haptic Interaction", Jun. 26, 2006, Department of Cybernetics, University of Reading, UK.*

Torstensson, Erik, "Physically-Based Real-Time Animation", 2006, Department of Electrical Engineering, Linkopings University.*

Lugrin, Jean-Luc et al., "AI-Based World Behavior for Emergent Narratives", Jun. 14-16, 2006, ACE 06, Hollywood, California, U.S.A., ACM.*

Cavazza, Marc et al., "New Behavioral Approaches for Virtual Environments", 2004, International Federation for Information Processing.*

Howard, Brad M. et al., "Desktop Haptic Virtual Assembly Using Physically Based Modeling", Jun. 14, 2007, Virtual Reality (2007), Springer-Verlag, London Limited.*

Anderson, Eike Falk, "Off-Line Evolution of Behavior for Automonous Agents in Real-Time Computer Games", 2002, Springer-Verlag Berlin Heidelberg.*

"Bullet Physics," http://www.blender.org/development/release-logs/blender-240/bullet-phyiscs/, Blender, downloaded Mar. 23, 2009, 3 pages.

Publisher's Description of Breve, http://download.cnet.com/breve/3000-2053 4-7897.html, Apr. 26, 2008, 7 pages.

"XPHEVE: An Extensible Physics Engine for Virtual Environments," Canadian Conference on Electrical and Computer Engineering, May 2006, pp. 1546-1549.

Jorissen, P. et al., "Dynamic interactions in physically realistic collaborative virtual environments," IEEE Transactions on Visualization and Computer Graphics, vol. 11, Issue 6, Nov.-Dec. 2005, pp. 649-660.

* cited by examiner

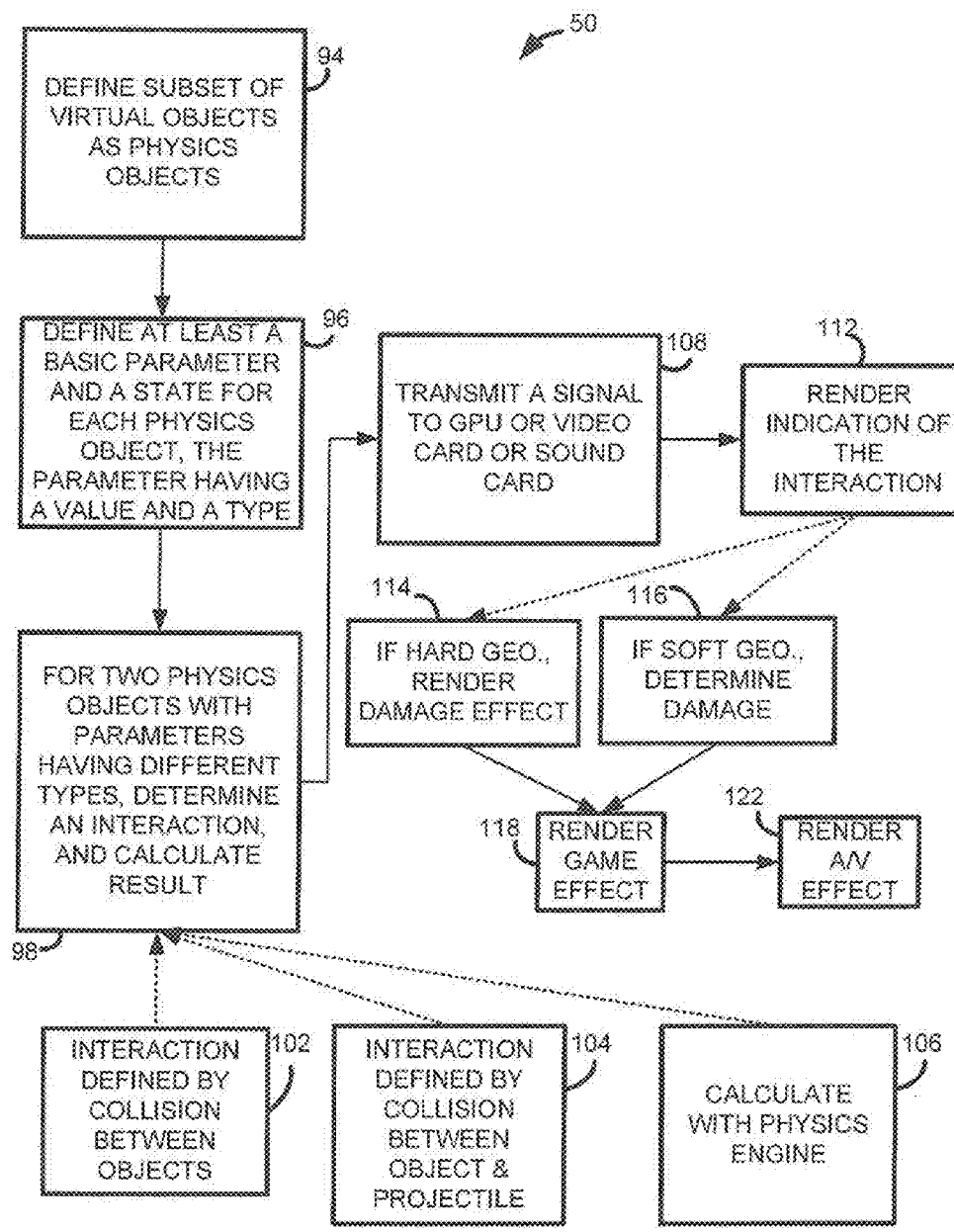

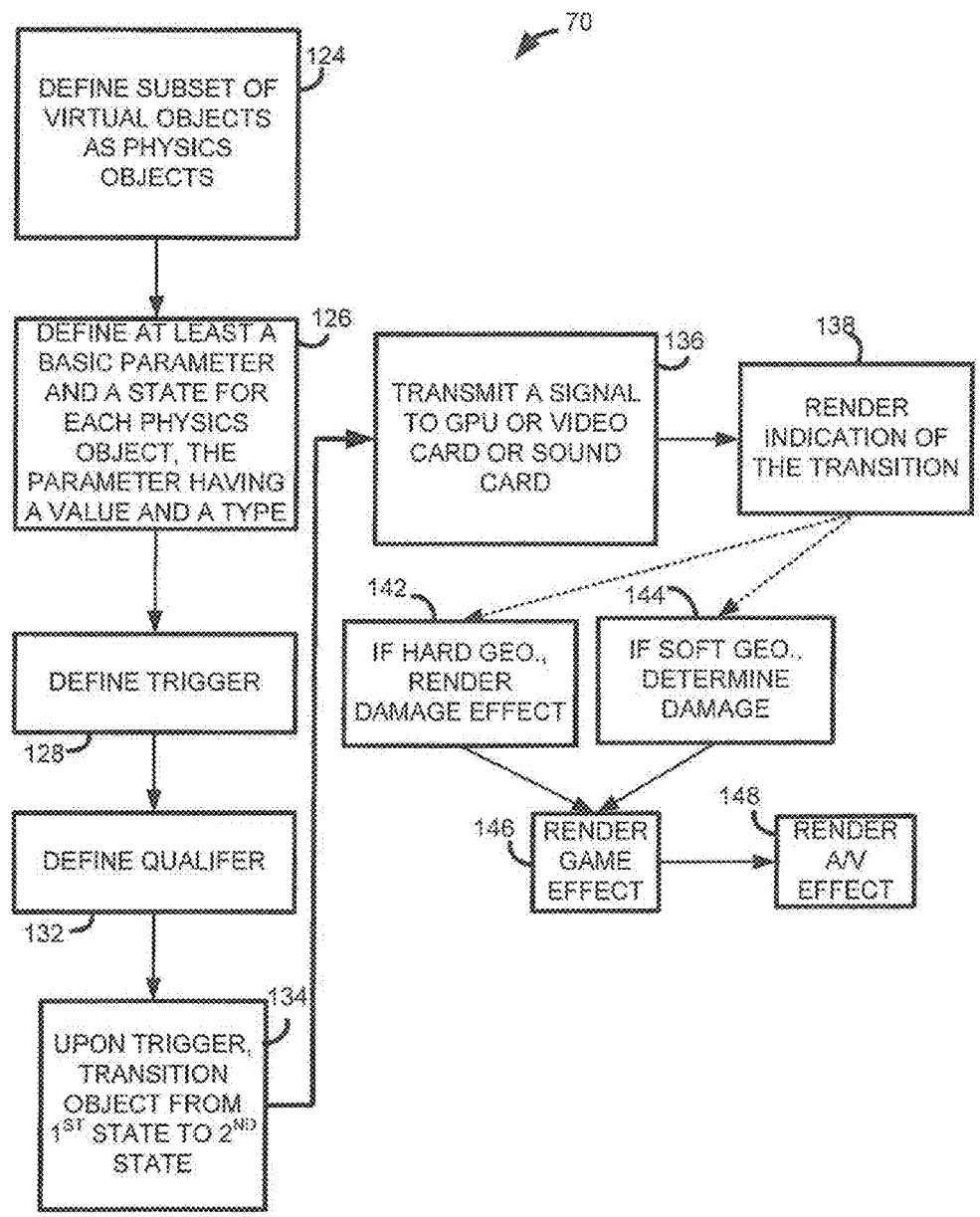

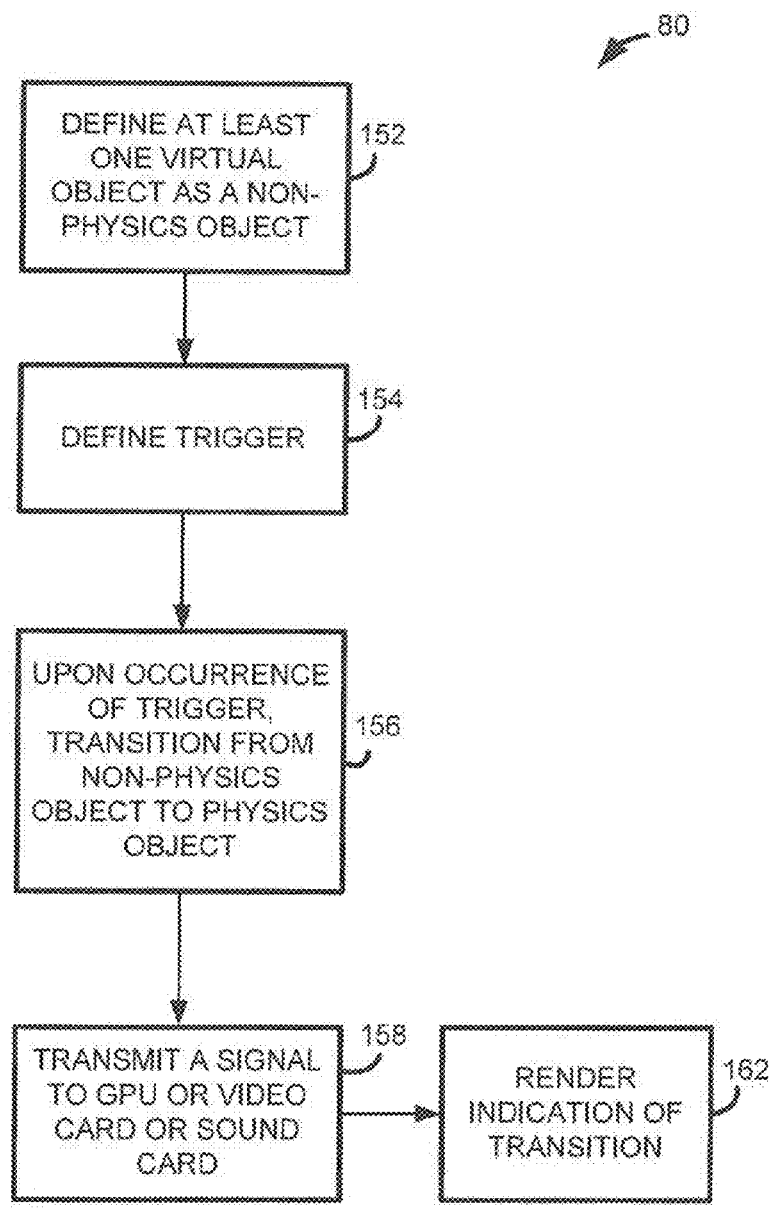

SYSTEM AND METHOD FOR PHYSICS INTERACTIONS IN A SIMULATION

CROSS-REFERENCE TO RELATED APPLICATIONS

This application claims benefit of U.S. Provisional Patent Application Ser. No. 61/082,679, filed Jul. 22, 2008, entitled "Physics Interactions in a Simulation", and herein incorporated by reference in its entirety.

BACKGROUND

Massively multiplayer online ("MMO") games enjoy tremendous popularity, with some games numbering players in the hundreds of thousands or even millions. Movement and physical interactions of virtual objects in simulations such as MMOs are controlled by rules set out by the developer. One way to increase the realism of such movement and interactions, and thus to increase player immersion, is to employ a physics simulator or engine, which controls the motion of predefined physics objects according to predetermined (though alterable) physical laws.

Physics engines provide an enhanced state of realism. Employing laws in two or three dimensions, such as conservation of energy and momentum, as well as elastic deformation of bodies, physics objects tend to appear to move in much more expected and realistic ways than in prior systems.

SUMMARY

Implementations of the system and method involve how items in a simulation become physics objects (which then behave according to rules in a physics engine or simulator) and also how rules are applied to manage physics objects. In the implementations, the interaction of physics objects is emergent, not solely dictated by an initial set of fixed rules.

Physics objects in a simulation such as an MMO are virtual objects that, when moving or undergoing any other input, do so based on physics simulations. As such, they may be a subset of a larger group of virtual 3-dimensional objects defined for a simulation. The forces and events that affect such physics objects can range from an incidental collision to a large explosion. Objects that do not operate by the rules of physics simulations are termed here as non-physics objects. In the context below, the use of the term "object" by itself may pertain to either or both physics objects and non-physics objects.

In some of the implementations described, physics objects are not merely predefined—players can create physics objects (e.g., a player character damaging a wall may lead to wall fragments becoming physics objects), and players can even turn their own or other players' player characters into physics objects.

As a specific example, in an online multiplayer game, a player character may destroy a wall and subsequently pick up a piece of concrete and propel the same at a door, causing the same to swing open on contact. A group of non-player characters may then attack the player character. The player character may return the attack, throwing another piece of concrete at the non-player characters, throwing the non-player characters in many directions. One non-player character may crash into a desk, knocking it across a room. In this scenario, the concrete pieces are dynamically-created physics objects generated from the wall. The non-player characters become physics objects when thrown through the air, and the desk is also a physics object.

Synergistic and emergent effects can arise from the interaction of these physics objects, where the effects are not pre-defined but rather arise from the interaction of the physics objects' properties themselves. As an example, a player character 'A' freezes a player character B in a block of ice. A player character C charges the block with electricity. The player character A may then pick up the block, be electrocuted, and the block is destroyed, freeing the player character B.

To accomplish these synergistic and emergent effects, physics objects are associated with basic parameters, e.g., size, shape, density, conditions, e.g., whether mobile or immobile, damaged, or destroyed, and game effects, e.g., game mechanics applied to physics objects. Physics objects may be "weaponized", in which case they may be used to attack enemy player characters. Audio and visual effects, e.g., surface damage, particles, and sounds, may further accompany physics objects.

The game environment may vary in its degree of use of physics objects and thus its subsequent destructability. Some objects, like iconic buildings, may have a "hard geometry", and such objects are immovable and unbreakable, though the same may show temporary surface damage. Other objects, with "soft geometry", can move if collided with, and may even be completely destroyed. These types of objects may self-repair with time. Instances, which spawn upon player direction, may be more destructible as the same are intended to be a private and unique environment for a given player or group of players. In these cases, the instance may reset and all physics objects may be restored to their original condition, for the next player to experience anew.

Many variations are possible. For example, the type of physics interaction may vary from game to game; some will require a high level of realism, while others may portray more of a cartoon reality.

In one aspect, the invention is directed toward a computer-readable medium, including instructions for causing a processor in an electronic device to perform a method of managing virtual 3-dimensional objects in a simulation. The method includes steps of defining a subset of virtual 3-dimensional objects in a simulation as physics objects; defining at least a first basic parameter and a first state for a first of the physics objects, the first basic parameter characterized by a first value and a first type; defining at least a second basic parameter and a second state for a second of the physics objects, the second basic parameter characterized by a second value and a second type, where the first type is different from the second type; defining at least one interaction between the first and second of the physics objects, a result of the interaction at least in part dependent upon the first and second parameters and first and second states; and sending a signal to a renderer and rendering an indication of the result of the interaction.

Implementations of the invention may include one or more of the following. The defining at least one interaction may be caused by the occurrence of a collision being detected between the first and second objects. The defining at least one interaction may be caused by the occurrence of a collision being detected between either of the first or second objects and a projectile directed by a player character or non-player character. The at least one state may be selected from the group consisting of: mobile, immobile, damaged, destroyed, or attached. The simulation may be a multiplayer online game. At least one of the first or second physics objects may be a player character or a non-player character. The method may further include defining at least one of the first or second physics objects as having a soft geometry, where if a state of a physics object having a soft geometry is damaged, the method further includes replacing the physics object with at least two physics objects or at least a physics object and a non-physics object. The method may further include defining at least one of the first or second physics objects as having a hard geometry, where if a state of a physics object having a hard geometry is damaged, the method further includes rendering damage effects on the physics object having a hard geometry. The first and second types may be selected from the group consisting of: weight, size, shape, density, and conductivity. The result of the interaction may be determined by an object rule set or a look-up table. The method may further include defining a physics object from one of the virtual 3-dimensional objects not previously defined as physics objects. The defined physics object may be a player character. The defined physics object may have a state defined as a weapon. The defining at least one interaction may include defining at least one rule set, the rule set pertaining to physics objects having basic parameters with a common type. The method may further include defining at least one game effect for at least one of the physics objects, where if a trigger occurs, the game effect occurs. The method may further include defining at least one audio or visual effect for at least one of the physics objects, where if a trigger occurs, the audio or visual effect is rendered.

In another aspect, the invention is directed towards a computer-readable medium, including instructions for causing a processor in an electronic device to perform a method of managing virtual 3-dimensional objects in a simulation. The method includes: defining a subset of virtual 3-dimensional objects in a simulation as physics objects; defining at least a first basic parameter and a first state for a first of the physics objects, the first basic parameter characterized by a first value and a first type; defining at least one trigger, where upon the occurrence of the trigger, the first of the physics objects is transitioned from the first state to a second state, a result of the transition at least in part dependent upon the first parameter and the first state; and sending a signal to a renderer and rendering an indication of the result of the transition.

Implementations of the invention may include one or more of the following. The trigger may be selected from the group consisting of: a player character or non-player character touching the first of the physics objects, a player character or non-player character damaging the first of the physics objects, a player character or non-player character picking up the first of the physics objects, a player character or non-player character throwing the first of the physics objects, or a predetermined scripted event. The defining at least one trigger may include defining at least one trigger which may be caused by a player character, a non-player character, or a virtual object, and may further include defining at least one qualifier on the trigger event, where the defining at least one qualifier includes defining which player characters, non-player characters, or virtual objects are allowed to cause a transition, or when transitions are allowed to occur. The simulation may be an MMO.

In yet another aspect, the invention is directed towards a computer-readable medium, including instructions for causing a processor in an electronic device to perform a method of managing virtual 3-dimensional objects in a simulation. The method includes: defining at least one virtual 3-dimensional object in a simulation to be a non-physics object; defining at least one trigger, where upon the occurrence of the trigger, transitioning the at least one virtual 3-dimensional object to be a physics object; and sending a signal to a renderer and rendering an indication of the result of the transition.

Implementations of the invention may include one or more of the following. The trigger may be selected from the group consisting of: a player character or non-player character touching the virtual 3-dimensional object, a player character or non-player character damaging the virtual 3-dimensional object, a player character or non-player character picking up the virtual 3-dimensional object, a player character or non-player character throwing the virtual 3-dimensional object, or a predetermined scripted event. The defining at least one trigger may include defining at least one trigger which may be caused by a player character, a non-player character, or a virtual object, and may further include defining at least one qualifier on the trigger, where the defining at least one qualifier includes defining which player characters, non-player characters, or virtual objects are allowed to cause a transition, or when transitions are allowed to occur.

In yet another aspect, the invention is directed towards a computer-readable medium including a system for managing virtual 3-dimensional objects in a simulation, the medium including the following modules: a database module for storing data about a plurality of virtual objects including physics objects, the objects in part defined by a state; and a physics engine module including a trigger defining module for defining transitions in an object from a first state to a second state.

Implementations of the invention may include one or more of the following. The first state may be a non-physics object and the second state may be a physics object.

In a further aspect, the invention is directed towards a computer-readable medium including a system for managing virtual 3-dimensional objects in a simulation. The medium includes the following modules: a database module for storing data about a plurality of virtual objects including physics objects, the physics objects in part defined by a state; and a physics engine module including: an interaction defining module for defining interactions between physics objects or between physics objects and non-physics objects; and an object rule set for defining a result of an interaction between physics objects or between physics objects and non-physics objects. Implementations of the invention may include that the object rule set may be a look-up table. Various of the defining steps above may be performed during development for certain objects, and during game play or game initiation for others.

Advantages of the invention may include one or more of the following. Physics objects are not just pre-defined but objects can transition into physics objects during gameplay. Rules define what objects are physics objects, and how transitions occur. Rules also define how physics objects interact with each other. The resulting gameplay can be synergistic and emergent, and can lead to unforeseen outcomes.

BRIEF DESCRIPTION OF THE DRAWINGS

FIG. 4 is a flowchart of a method for implementing physics objects interactions.

FIG. 5 is a flowchart of another method for implementing physics objects interactions.

FIG. 6 is a flowchart of a method for creating physics objects from non-physics objects.

DETAILED DESCRIPTION

Figure 1:
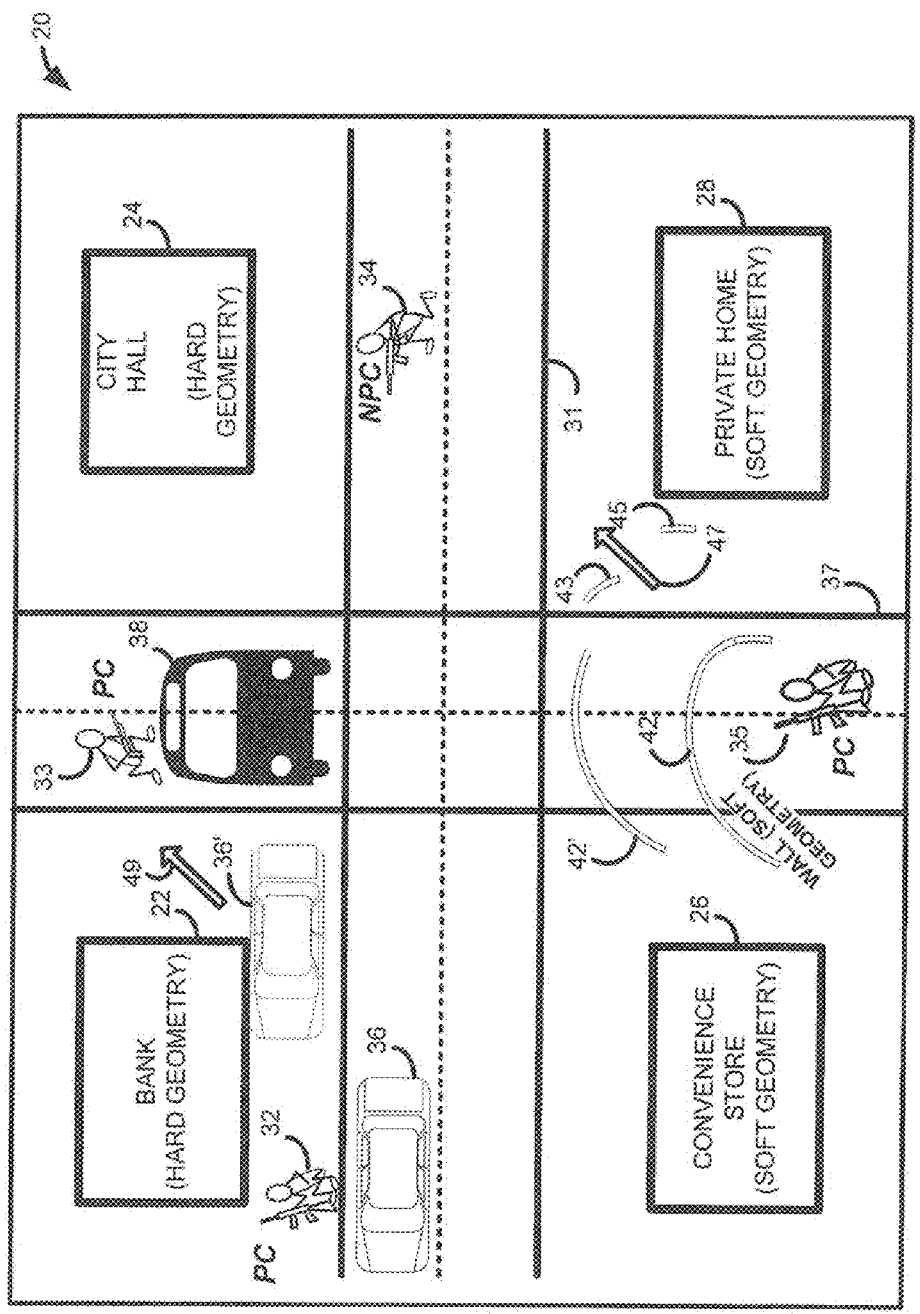
FIG. 1 illustrates an exemplary environment of the simulation, e.g., a multiplayer game, and further illustrates how physics objects may be spawned and may interact with other physics objects in emergent ways.

Referring to FIG. 1, an exemplary environment of a simulation, e.g., a multiplayer game, is illustrated. The environment may vary widely, and may be, e.g., a fantasy simulation, a science fiction simulation, a space simulation, a real world simulation, a city simulation, an apocalyptic simulation, a superhero simulation, an offline game, and so on. The exemplary simulation of FIG. 1 shows a number of characters 32, 33, 34, and 35, and the same are shown traversing various streets 31 and 37 within a game environment 20. In FIG. 1, the characters 32, 33, and 35 are intended to portray player characters ("PC"s in the figures), controlled by players. The same interact with other players' player characters as well as with computer-controlled characters, or non-player characters ("NPC"s in the figures). The character 34 is intended to portray a non-player character, controlled by the simulation or game engine. That is, a non-player character is controlled by the simulation, either at the server level or by the client software, and the same acts in a way dictated by the software instructions and data set for that non-player character. A player may interact with the non-player character 34 by clicking on or otherwise activating the non-player character or an icon associated with it.

A number of city features are also shown, such as a bank 22, a city hall 24, a convenience store 26, and a private home 28. The features will vary according to the applicable game environment. The city features have predefined types of geometries associated with them, and these geometries define in part how the city features react upon their interaction with physics objects. Certain city features may be physics objects themselves. In FIG. 1, the bank 22 and the city hall 24 each have a "hard" geometry and thus are generally immovable and unbreakable, since such virtual objects, e.g., iconic buildings, are required for player interactions and are required to be present for consistent game play. Hard geometry structures and areas have constant positions, and the same do not generally change position as a result of collisions or damage. Nevertheless, upon a player character, non-player character, or other virtual object attempting to damage such hard geometry features, the same may exhibit temporary surface damage, but generally still represents a permanent fixture in the environment. As a specific example, a villain player character 32 may attempt to destroy the bank 22 in order to rob it. The player character 32 may assault the bank 22, causing its walls to crack and scar; however, the bank 22 will not be destroyed. In this example, the bank 22 has a hard geometry will always remain in the same position and have the same structure regardless of the damage applied to it.

On the other hand, the convenience store 26 and the private home 28 each have a soft geometry, which in one implementation means that they can move if damaged or collided with, and may even be completely destroyed, since the destruction or damage of these features may be accomplished without overly disrupting game play. Their damage or destruction may even lead to the creation of physics objects from their constituent parts. In one implementation, when a soft geometry object is destroyed, it creates different types of debris in order to convey the damage. The debris may be particles, whose existence is transitory, and physics objects, which may persist. In the above example, the villain player character 32 may enter the bank 22 and locate the vault along a wall behind a teller's counter. The villain player character 32 may shoot at the counter, causing a hole to form and leaving behind rubble. In this example, even though the bank 22 has a hard geometry, the counter is soft geometry that, after taking damage, breaks and spawns physics objects in the form of, e.g., wooden chunks.

Of course, the choice of which features have soft geometry and which have hard geometry is completely arbitrary and depends on the requirements of the developer. In some implementations, it may be desirable to have all objects of a certain variety have the same type of geometry. In this way, through the act of playing, players will learn how objects get damaged and which objects are breakable.

FIG. 1 also illustrates various potential physics objects, in particular, a car 36, a bus 38, and a wall 42. The wall 42 has a soft geometry and thus is capable of being damaged or destroyed. FIG. 1 illustrates this aspect, showing the wall in a destroyed configuration, with now-separated components 42', 43, and 45, following a blast or other destructive force in the general direction of arrow 47. The wall 42 may have been a physics object prior to the destruction, and upon a collision being detected, the wall may have been transformed into a physics object. Similarly, one or all of components 42', 43, and 45 may be flagged or classified as physics objects, although they need not be. For example, wall component 42' may be classified as a non-physics object, but components 43 and 45 may be classified as physics objects. The wall components 43 and 45 may also be weaponized, i.e., classified or flagged as a weapon that can cause damage to another player character or non-player character. The arrow 47 may also represent the direction that the player character 35 may throw one or both of the components 43 and 45 in order to strike the non-player character 34.

The car 36 and the bus 38 may also be physics objects, and FIG. 1 illustrates in a very schematic way how the player character 32 may throw the car 36 in a direction indicated by an arrow 49, causing the car 36 to strike the bank 22 and come to rest in a damaged or destroyed configuration indicated by the car 36'. The impact may cause temporary surface damage to the bank 22, though this damage may heal rapidly and may not affect the operation of such hard geometry structures.

In some simulations, destruction of items and the environment will be commonplace; consequently, the handling of these interactions becomes an important part of the simulation and of the user's experience. For example, a player with a supervillain or giant monster character may want to create lots of rubble and broken pieces of cars.

These and other aspects of the interactions of physics objects are discussed below in connection with FIGS. 3-5.

Figure 2:
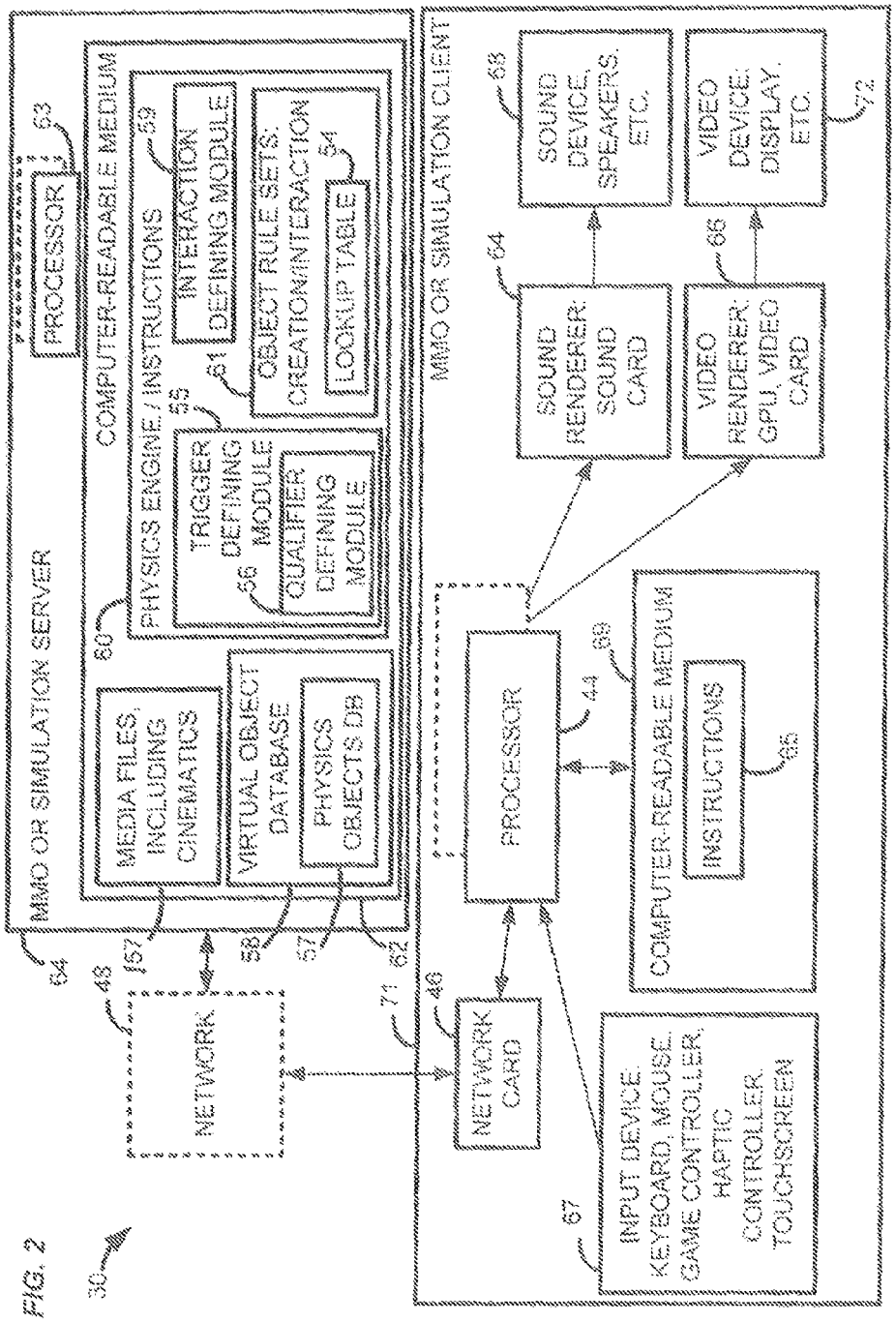
FIG. 2 illustrates a logical diagram of a system that may be employed to implement a simulation such as a multiplayer game, including a client-server architecture.

FIG. 2 illustrates a logical diagram of a system 30 that may be employed to implement a simulation such as a multiplayer game. The system 30 includes an MMO or simulation client computing device 71 and an MMO or simulation server 64 which communicate by way of a network 48. The client computing device 71 includes one or more processors 44 which communicates with the network 48 via a network card 46 or via a network-enabled processor (not shown). The client computing device 71 has client software running which enables communication with the network 48 and server 64.

The client computing device 71 includes at least one input device 67, which may include a keyboard, mouse, game controller, haptic controller, touchscreen, or any other device which may provide an input to a computer. The client computing device 71 further includes a computer-readable medium 69, such as a hard drive, flash memory, solid state drive, or the like, which stores instructions 65 for the processor 44, including instructions for the client operations of the simulation, e.g., an MMO.

The computer-readable medium 69 may also store media files including graphics files and cinematics files. These media files may also be streamed when needed from the server 64. In some implementations, certain media files may be downloaded to the client, especially those that are often used, and others may be kept at the server for later streaming, to avoid cluttering the client system. Certain media files are may also be cached at the client system, such as those pertaining to the immediate game locale of the player character.

The client computing device 71 also includes a sound renderer 64, such as a sound card, by which signals pertaining to game sounds may be put in a form suitable for playing on a sound device 68, e.g., computer speakers. Moreover, the client computing device 71 also includes a video renderer 66, such as one or more GPUs or video cards, or both, by which signals pertaining to game video may be put in a form suitable for playing on a video device 72, e.g., a computer display. The video renderer 66 may also include, e.g., integrated graphics.

The simulation server 64 controls the game, and may be a game server having one or more processors 63 and running a game engine and other components, including a user interface, input/output components, and the like. The server 64 also includes modules such as a physics engine 60, and a database of virtual objects 58, a subset 57 of which are physics objects. Certain of these components or modules may be implemented on a computer-readable medium 62, which includes instruction for carrying out these and other processes. The computer-readable medium 62 may also include media files, including cinematics and other graphics files, for downloading or streaming to client computing devices 71.

The physics engine 60 may further include a number of modules or components, each of which may be stored on the same or a different computer-readable medium 62. Portions of the physics engine may include physics simulator solutions available from Havok, Inc., of San Francisco, Calif. First, a trigger defining module 55 may be employed to determine and define circumstances under which object states are allowed to change, e.g., from being a non-physics object to being a physics object. A qualifier defining module 56 may be employed as part of the trigger defining module 55 to determine and limit what virtual objects, e.g., which player characters or non-player characters may be allowed to change the state of a physics object or non-physics object, as well as when such changes are allowed to occur. Triggers may be employed to change the state of a physics object or non-physics object, and may further be employed to change an non-physics object to a physics object or vice-versa.

An interaction defining means 59 may be employed to determine and define when two or more objects, e.g., two physics objects, two non-physics objects, or a physics object and a non-physics object, have interacted and thus require a calculation to determine the result.

A module 61 with one or more object rule sets may be employed to determine and/or define how and when non-physics objects transition to become physics objects and vice-versa, as well as to determine and/or define the result of interacted objects, e.g., physics objects with one another, physics objects with non-physics objects, and physics objects with the environment. One such exemplary rule employed in determining the result of interactions may be that momentum is conserved in collisions. A look-up table 54 may also be employed as part of the object rule sets module 61 to define any number of other results, and an exemplary look-up table is illustrated by Table I below. For example, if a lightning bolt is thrown at a player character, the characteristics of the lightning bolt weapon may be defined in the table such that the player character will be damaged by virtue of electrocution. The look-up table may also define and determine that the clothes and skin of the player character will undergo some burn damage as well. The functions of these modules are discussed in greater detail below.

Different rule sets may be employed, depending on the type of simulation. While a highly realistic physics model may be desirable for a serious car simulation, a more energetic and "fun" model may be better for a game reflecting a cartoon-style reality. However, by defining how objects can become physics objects and how the objects then interact with other objects and the players of the game, the interaction of the game objects becomes flexible and increasing player satisfaction.

Figure 3:
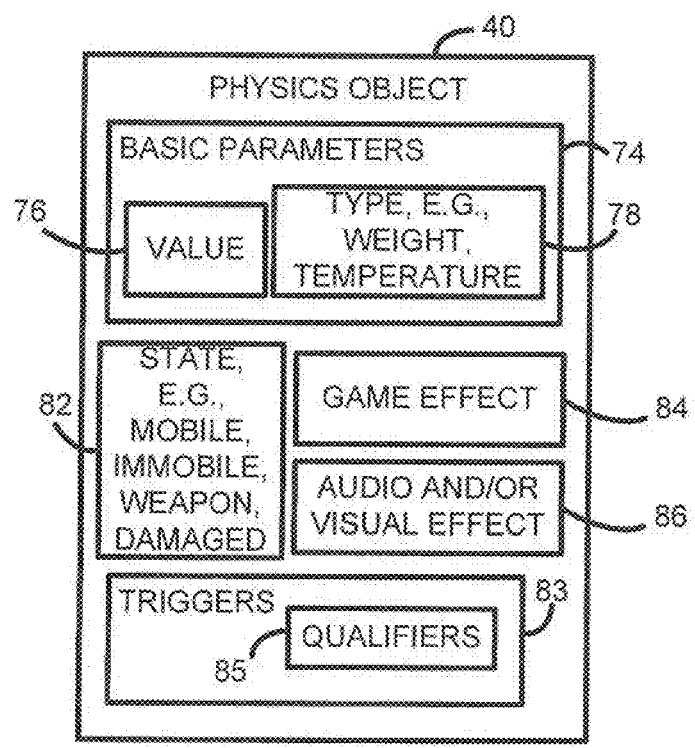
FIG. 3 is a partial data structure of a virtual object such as a physics object.

FIG. 3 is a partial data structure of a physics object 40. A non-physics object may have a similar data structure. The ways in which objects interact in a simulated environment is based on a number of factors as displayed, including their basic parameters, conditions and game effects applied to the same, and other factors, e.g., if they are being used as a weapon, i.e., if they have been "weaponized".

Basic parameters are used to control physics objects such that they look and behave in ways players expect. As an example of how different physics objects respond when subjected to similar forces, if a superhero player character is chasing a street gang through a warehouse, the characters may strike numerous large shipping crates, knocking the same aside. Smaller objects, like paint buckets, may be kicked away more violently, while even smaller objects, such as bottles, may shatter on impact. These objects differ in their basic parameters, and thus have different results upon impact.

While not all physical properties need be defined, certain basic parameters 74 with significant influences are defined for the physics object 40, of which just one is shown in FIG. 3 for clarity. Generally each basic parameter 74 will have a value 76 and a type 78. For example, one basic parameter 74 of a player character may be that the player character weighs 90 kg, or has a temperature of 37° C. Basic parameters may be numerous; other typical parameters include size, shape, density, and conductivity. Certain parameters may be common to all objects in a given area, such as the effect of gravity. Although in some implementations even the effect of gravity may be configured to differ from physics object to physics object.

A condition is a restraint on a physics object whereby it may only act and react in specified ways. These may cover a wide range of functionality, and may be divided into states and triggers.

Regarding the first, each physics object 40 may have an associated state 82. A state refers to how a physics object acts or reacts to an outside stimulus, e.g., whether the physics object 40 is mobile, immobile, weaponized, damaged, destroyed, attached to another object, or the like. One of ordinary skill in the art will see numerous variations of these examples, given this teaching. As a specific example, a player character may try to push a barrel, and the same moves easily. The player character may try to push another barrel, but the other barrel does not move, and investigation shows that it has been glued to the ground. In this example, one barrel's state is set to mobile, while the other's is set to immobile.

Regarding the second type of condition, each physics object 40 may also have a variety of triggers 83 associated with it. Triggers are circumstances that allow object states to change, such as "on touch", "on damage", "on pick up", "on thrown", or "on scripted event". The triggers 83 may have qualifiers 85 associated with the same, which signify who or what is allowed to change the state of an object, and when those changes are allowed to occur. In the example of the immobile barrel above, a player character may attempt to punch the barrel, and the same may then break free and move freely. In this case, the act of applying damage to the barrel was a trigger that changed the barrel's state to mobile.

In another specific example, a superhero may chase a criminal to the edge of a large, open section of a warehouse that extends down several stories. The criminal may jump to a suspended platform a short distance below, and the superhero may follow. The force of the superhero's impact on the platform may cause the platform to waver, swing, and incline, causing several barrels on the platform to roll off. Certain of the chains supporting the platform may then break, causing the superhero and criminal to fall to the floor of the warehouse, and may have their fall broken by landing in a pile of crates on the floor. In this example, the way the platform moves when a player character lands on it is a result of how it is suspended, e.g., by four chains. The barrels roll by way of conditions in their physics object data structure 40. The chains suspending the platform is triggered to detach when a threshold of pressure or weight is reached on the platform; this may be treated as damage applied over a period of time. The crates on the warehouse floor are triggered to break instantly upon impact, e.g., when subjected to damage from the fall. In some cases, the amount of damage suffered by the crates is not total, but may be estimated by the distance fallen by the player characters and non-player characters, as well as their weight. For example, the damage may rise in a linear (or other) fashion up until a threshold distance and/or weight is reached, after which point the crates will be classified as completely destroyed, and will be so rendered. Of course, depending on the type of environment, the same will generally respawn after a time.

Each physics object 40 may further be associated with a game effect 84 that is keyed to the trigger. The game effect is a mechanic that is innate or applied to the object, and defines how the object reacts to outside stimulus. For example, an explosive barrel will act like any normal barrel when pushed, but when damaged may explode, and in this case the explosion is the barrel object's triggered game effect. To give a physics object an innate game effect, a game effect may be linked from a game effects database to the physics object as one of its properties in its data structure 40.

Some objects may have a permanent game effect applied. For example, a "magma" rock may be permanently superheated and will always burn when touched. The constant heat is a game effect that is associated with the object. Game effects may also be applied by players to objects that normally are not associated with one. In a specific example, after falling to the ground, a criminal may jump up and begin running. A superhero may charge up a ball of electricity and fire it at a stack of barrels ahead of the criminal. The impact may cause the barrels to topple and block the criminal's path. The electrified barrels may then crackle with electric charge, magnetically drawing in other objects. If the criminal attempts to push aside a barrel, they may be damaged with a small arc of lightning. In this example, the player has used their player character's electrical powers to apply a game effect to a physics object that previously had none. This game effect in turn damages those who touch the physics object, and also causes the object to act in a way, i.e., magnetic, that attracts other objects made of similar materials.

Each physics object 40 may further be associated with an audio and/or visual effect 86 (termed an "A/V effect") that is keyed to the trigger. A/V effects 86 generally include effects rendered for the user's viewing or listening pertaining to an object or to a game affect associated with an object. Accordingly, some A/V effects are keyed to game effects caused by interactions, although some A/V effects may be present in physics objects even in the absence of interactions. A/V effects may include one or more of the following non-limiting examples: surface damage, which is generally temporary damage appearing on a surface of an object; particles, which are small pieces of debris following damage; sounds, which are audio feedback from damage; degradation, in which objects may fall apart from damage; and object creation, in which new objects may be created from the damage. The A/V effects may further change based on the state of an object.

As another specific example, a player character may smash open a truck and remove its engine block. The player character may throw the engine block at a passing car, causing the car's hood to crumple from the impact. The engine block is now severely scratched, and begins to sputter and spark. The player character may pick the engine block up again, throwing it at other player characters or non-player characters. Upon impact with the ground, the engine block may break apart. In this example, the engine block uses a series of sounds and particles to convey its condition. When the car is struck, its hood and engine show surface damage and degradation. The engine block also shows surface damage in the scratches, and further shows particles, e.g., sparks, and sounds, e.g., sputtering, from the damage. When the engine block is finally destroyed, the destruction may be conveyed by large changes to the engine block's appearance, along with new objects that may be created to simulate its breaking apart. Through all of these changes, physics object models may be updated to reflect and render the visual changes undergone by the objects.

As another example, a villain player character may attempt to rob a bank but find its vault sealed. The player character may strike the vault door repeatedly, causing numerous dents but not unsealing it. The player character may then fire an energy blast at a low-hanging ceiling beam, causing large concrete chunks to break off and crash to the ground. The impact cracks the bank floor and kicks up a large amount of dust. The ceiling beam has been reduced to, e.g., rebar, with only a small amount of stressed concrete remaining. In this example, the vault door degrades when struck and the ceiling beam degrades to rebar when subjected to an energy blast. The concrete chunks are objects created from the blast which generate sound when they land. The floor receives a surface damage crack from the impact, and the dust are particle effects.

Physics objects may be categorized as one or more of the following types. In any given simulation, not all types need be represented, and physics objects may belong to more than one type. A first type of physics object is a persistent prop, which is an object that remains in an environment until reset; these may include certain critical game play elements, needed for a specific objective, obstacle, goal, or quest. Another type is an FX prop, which is an object that may be destroyed when subject to damage. Another type is a weaponized prop, which is an object that a player character may pick up and use as a weapon. Another type is a game effect prop, which is an object to which a game mechanism is associated. Another type is a dynamic prop, which is an object that is created on-the-fly as a result of an in-game occurrence, as opposed to props that are placed by developers. Dynamic props may include physics objects created as a result of damage caused by a player character.

With regard to weaponized props, when physics objects are employed in this way, then they gain weapon-specific functionality and behave in a controlled manner. Some basic parameters and conditions may still apply to weaponized physics objects. These include durability of the weapon, game effects, and other properties.

In another specific example, a criminal may pick up a piece of rebar as it slides towards a number of barrels, and then proceed to attack a superhero player character with it. The player character may respond by picking up a crate and using it as a weapon against the criminal. The rebar may eventually deform as it strikes the superhero, and eventually may be rendered unusable. In response, the superhero may throw the crate at the criminal, breaking the crate and rendering the criminal unconscious. In this example, both the superhero and the non-player character criminal use physics objects as weapons. The enemy non-player character criminal uses his as a club, whereas the superhero player character uses his as a projectile. The deformation of the rebar may be implemented, both as a game effect and as an A/V effect, by using a damage over time calculation. The crate shattering may be implemented by giving certain objects "hit points". Once the object has zero hit points, it is considered destroyed, and is rendered accordingly. In many cases, new physics objects, e.g., dynamic props, will be spawned in their place. In some cases, such dynamic props may only exist for a few seconds after being spawned, but other cases may require such objects to remain in the environment and act and be used like any other physics object. In another specific example, a superhero player character may use a lamp post to damage a passing car. The car and the lamp post both take damage, and the lamp post snaps near its top. The wiring running through the shaft keeps the top part connected. When a player character swings the lamp post again, the top part flails about randomly, though the same may still be an effective weapon. In this example, the lamp post represents a weaponized physics object that still shows the influence of physics. Even though the base is controlled by the player, the top becomes loose and responsive. The physics engine may in some implementations simulate the motion (if swung) as a rotation and revolution with yet another revolution, i.e., the loose top, superimposed on top.

Physics objects may also be spawned by game events. For example, game events can trigger environmental destruction, and environmental destruction can trigger game events. In another specific example, a player character is chasing a villain through city sewers. The player character enters a dark sub-chamber that appears to be a dead end. Before the player character can retrace their steps, an explosion occurs and the ceiling above the door collapses, blocking their path. The player character notices a small, barred window on one of back walls. The player character fires a concentrated heat ray at the bars, but in doing so triggers hidden weapons to activate. In this example, the ceiling collapsing when players attempt to leave the room represents environmental destruction caused by an event. When the player character attacks the soft geometry of the barred window, the attack activates the hidden weapons; in this case, the activation represents an event caused by environmental destruction.

Other environmental factors or non-player character or player character powers may also affect physics objects in a simulation such as an MMO. For example, volcanic eruptions may be provided, and the same may generate or spray rocks and lava. Earthquakes may occur, and the same may dislodge player characters and non-player characters, as well as create various objects including physics objects. A portable singularity may be provided, which pulls player characters and objects toward itself, and in some implementations may further cause a teleportation of a player character or non-player character to occur. An airbag power or effect may be provided to player character, where the player character is then surrounded by airbags, causing the player character to be shielded from physics objects and damage, but also making the player character bounce as well as be ineffectual in battle. Player characters or non-player characters may be provided with a power of telekinesis, whereby they may be able to move objects without touching them. A subset of objects may acquire a "grounded" state, in which they are rendered extremely heavy, to the point where they cannot be moved or weaponized. In this state, airborne objects may crash to the ground, and weaponized objects may become too heavy to carry. Gravitational or antigravitational sources may be provided; these sources, which may be movable, may then attract or repel nearby objects and player characters or non-player characters. A "rebound" power may also be provided, by which physics objects are launched away from a player character.

In another specific example, a player character steps onto a street and attacks an oncoming car, causing the same to overturn. The player character then picks up the car and throws it at a large bronze statute of an iconic non-player character. The car bounces off the statue, landing on and destroying a flowerbed. The player character attempts to pick up the car again, but the same is on fire and too hot to touch. Instead, the player character attacks a fountain near the statue until large chunks of marble break off the fountain. The player character then picks up the marble chunks and throws the same at the statue, damaging the same. In this example, the car is initially classified as a type of non-player character, but it becomes a weaponized prop when thrown, and then becomes a game effect prop when it catches on fire. The flowerbed may be one or more FX props. The statue is a persistent prop and cannot be destroyed, but may endure a small amount of damage, before a subsequent healing, or may alternatively be dislodged. The fountain is soft geometry, and its marble chunks are dynamic props that can become weaponized.

FIG. 4 is a flowchart of a method 50 for implementing physics objects interactions. In a first step, a subset of virtual objects are defined as physics objects (step 94). In a next step, at least one basic parameter and state are defined for each of the physics objects (step 96), the basic parameter having a value and a type. The steps 94 and 96 may generally be performed at the time of creation of the physics object, which may be at the initial loading of the game, at any time thereafter, or at the time of development.

A next step is to determine the result of an interaction for any two or more objects having different basic parameter types, as well as a result of the interaction (step 98). This step may be accomplished in a number of ways. First, certain interactions will have predefined results. For example, one type of interaction is a collision between objects, which may be physics objects and/or non-physics objects, as determined by collision detection and with a result dictated by the physics engine (step 102). Here it is noted that a collision may be any touching of objects. Another type of interaction is a collision between an object, such as a physics object or a non-physics object, and a projectile (step 104). This type of interaction may be typical of a player character or non-player character attacking the physics object or non-physics object, e.g., by melee or ranged weapons, by magical spells, by laser light or other electromagnetic forces, or the like.

The above collision examples are common. However, even more numerous types of interactions may be provided by the system. In general, interactions are determined by object rule set, which may include use of a look-up table (step 106). A look-up table provides one way of accounting for the numerous types of interactions that may occur, as well as for the synergistic effects that may ensue. Such a table is illustrated below as Table I, which should be understood to only exemplary and as such is very limited compared to the potential number of such effects.

The above description generally pertains to object interactions where the object have different types of basic parameters. In some cases, an interaction will be defined for physics objects having the same type of basic parameter. For example, two physics objects may each have an associated basic parameter of weight. If the two become conjoined, such as by being slammed together or by a magnetic effect, the result may be a single physics object having a weight of the sum of the individual weights.

As an indication of the interaction, a signal may be transmitted to a GPU or video card or sound card, or a combination of these (step 108), and the signal may then cause a rendering of an indication of the interaction (step 112).

The rendering may take a number of forms. If the physics object or non-physics object was categorized or otherwise categorized as having a hard geometry, then a damage effect may be rendered (step 114), e.g., a superficial or surface damage effect that may heal with time. If the object was categorized as having a soft geometry, then a calculation may be performed to determine to what extent the object was damaged (step 116). For example, a small amount of damage may lead to surface damage such as scratches, while a large amount of damage may lead to the object being broken apart, e.g., into smaller objects, which may in turn be physics objects or non-physics objects, into particles, or both. One way to accomplish the calculation is to assign hit points to the object, and as damage accrues, the number of hit points decreases. Once an object is at zero hit points, it is considered destroyed. Particularly sophisticated calculations may also be employed, including consideration of the material properties of the physics object, such as the granularity of its structure, weight, volume, and the like, as well as the trajectory and other characteristics of the colliding object, e.g., projectile.

Next steps of the method 50, which may be included as part of the step of rendering an indication of the interaction (step 112), include rendering a game effect (step 118) and rendering an A/V effect (step 122).

FIG. 5 is a flowchart of another method 70 for implementing physics objects interactions. In the method 70, a physics object is caused to undergo a transition from a first state to a second state. Certain of the steps are in common with the method of FIG. 4.

In a first step, a subset of virtual objects are defined as physics objects (step 94). In a next step, at least one basic parameter and state are defined for each of the physics objects (step 126), the basic parameter having a value and a type. A trigger may then be defined (step 128), the trigger causing the physics object to transition from one state to another. A qualifier may then be defined for the trigger (step 132), the qualifier defined above, e.g., who or what may cause the trigger to transition the state. Steps 124, 126, 128, and 132 may generally be performed at the time of creation of the physics object, which may be at the initial loading of the game, at any time thereafter, or at the time of development.

Upon the occurrence of a trigger event, the physics object is then caused to transition from a first state to a second state (step 134). As an indication of the transition, a signal may be transmitted to a GPU or video card or sound card, or a combination of these (step 136), and the signal may then cause a rendering of the transition (step 138).

As in FIG. 4, the rendering may take a number of forms. If the physics object has a hard geometry, a damage effect may be rendered (step 142). If the physics object has a soft geometry, then a calculation may be performed to determine to what extent the physics object was damaged (step 144).

Next steps of the method 70, which may be included as part of the step of rendering an indication of the transition (step 138), include rendering a game effect (step 146) and rendering an A/V effect (step 148).

If two or more objects such as physics objects are involved in an interaction, then the above method 70 may be performed for each physics object, and the method 50 may further be employed to define the results of transitions and interactions. The methods may further be used to determine the effect on physics objects from game events, damage caused by player characters and non-player characters, as well as damage caused on physics objects by non-physics objects and vice-versa.

Referring to FIG. 6, a flowchart is shown of a method 80 for creating physics objects from non-physics objects. A first step of the method is to define at least one virtual object as a non-physics object (step 152). Generally such objects are modeled as 3-dimensional objects, although the method and system are not so limited. A next step is to define a trigger, upon which a non-physics object will transition to a physics object (step 154), and a qualifier may further be defined for the trigger. The triggers and qualifiers may be generally the same as those defined above with respect to transitioning a physics object from a first state to a second state, except that in this case a non-physics object is transitioning into being a physics object. As with corresponding steps noted above, the steps 152 and 154 may generally be performed at the time of creation of the physics object, which may be at the initial loading of the game, at any time thereafter, or at the time of development.

Upon the occurrence of a trigger, the non-physics object then transitions into a physics object (step 156). Certain triggers and transitions are noted below in Table II, which should be understood to be only exemplary and as such is very limited compared to the potential number of such triggers and transitions.

As above, as an indication of the transition, a signal may be transmitted to a GPU or video card or sound card, or a combination of these (step 158), and the signal may then cause a rendering of the transition (step 162). The rendering may be performed in any of the ways noted above.

In cases where physics objects are damaged or destroyed, the system and method also provide a way to handle repairs. In particular, a repair routine may be employed to assist environments reset themselves after an interaction. Generally, most objects will repair over time. However, certain exceptions exist. For example, in an instance, all of the objects may be automatically reset when the instance is reloaded. In some implementations, non-player characters flagged as "technicians" can repair damaged objects. These objects then return to their undamaged state and do not reset.

In a specific example, a villain player character may rob a bank, damaging its exterior and interior, and then escape. The player character may notice that both the interior and the exterior of the bank have been completely healed and thus have no damage. In this example, the exterior of the bank is part of the open game environment world, so its destruction was repaired slowly while the player character was inside. The bank interior is considered an instance, so when the player character leaves, the bank's interior content may immediately reset.

Different types of areas within a game environment may take damage differently. This may in part depend on how private or public the area is.

For example, cities may represent large, open-world sections of the game. Since such areas may be desired to remain relatively stable in terms of geometry, they may be the least destructible environments. Such areas may include primarily hard geometry objects and structures. Certain soft geometry objects may also be present, along with some predefined physics objects. All of these objects and structures may have varying amounts of A/V effects associated with the same. In a specific example, a villain player character may pick up a passing car and toss it at a store front, causing the store front's awning to fall and its windows to shatter and crumple. The player character may pick up the car again and throw it at the side of an apartment building, causing some concrete molding to break and fall to pieces. The car lands on the pavement leaving a crack. In this example, the car and awning are physics objects. The store front has a soft geometry and thus deforms, and further creates glass particle effects. The concrete molding has a soft geometry while the apartment building to which it is attached has a hard geometry. The concrete molding generates pieces of concrete rubble, which are physics objects, and when the car lands, the pavement, which is hard geometry, receives surface damage.

Instances are private versions of areas that are created on demand for players or groups of players. Since these are private, more soft geometry may be provided than in the open public game environment, though hard geometry may still make up the majority of these areas. The ratio of these hard to soft geometry areas is dictated by the design of each instance. Instances may also have a significant number of physics objects, and A/V effects may be present on many objects within. In a specific example, a player character superhero may be fighting a villain in an auditorium. The villain may attack the player character superhero, launching the same across the room. The player character may destroy several rows of seats, as well as a support column, before landing against a back wall, cracking the same on impact. In this example, the seats are physics objects and the column is soft geometry; both break on impact. The back wall is hard geometry and its crack is an A/V effect to imply damage.

Another area in which damage effects may differ from open world game environments are arenas, which are large, terrain-based multiplayer areas. Since these areas are designed to let players take advantage of all of their abilities and skills, the destruction provided in arenas may be significant. Physics objects may be larger, and more soft geometry may be built into the terrain and into buildings. In a specific example, a player character superhero may approach an enemy non-player character bunker in order to destroy it. Before the player character can get in range to attack, an enemy tank may roll out from behind a cliff. The player character sprints to the nearest cliff face and punches it to knock loose some large boulders. The player character then lifts a boulder and throws it. The boulder lands on the lead tank, crushing the same to pieces and leaving a huge crack on the ground. The player character then runs to the bunker and attacks it, freezing a large roof turret and shattering the same with an energy blast. The enemy then sends forces out of the bunker's front entrance. The player character stuns the forces and concentrates firepower on the door. Small bits of rubble start coming loose and falling down. After a time period, the door's arch collapses in front of the entrance. In this example, the cliff face has soft geometry and is located above the hard geometry terrain. The boulders, which are physics objects, are generated when the soft geometry cliff face is damaged. The boulder's impact crushes the tank, which is also a physics object, and the ground appears cracked using an A/V effect. The buildings of the bunker are primarily soft geometry, and many weak points, e.g., turrets, doors, or the like, are configured to be completely destructible and to generate rubble, some or all of which may be physics objects, upon their destruction.

Systems and methods have been described for the creation and handling of physics objects. The combinatory effects of these physics objects interacting and subsequent gameplay appears emergent rather than dictated. The systems and methods create elements that interact in surprising ways based on how players use them. Players are able to create physics objects, turn themselves and other players into physics objects, and create spontaneous synergistic effects by the interaction of these physics objects and forces in ways that exceed simple, predefined interactions.

Additional variations and implementations are also possible. Accordingly the scope of the invention is not limited only to the specific examples laid out herein.

TABLE I

LOOK-UP TABLE (PARTIAL) OF POTENTIALLY SYNERGISTIC GAME/OBJECT AND A/V EFFECTS

| Type of Game Effect | Type of Object | | | |
| --- | --- | --- | --- | --- |
| | Wet Object | Dry Object | Player or non-player character | Flying Object |
| Lightning | Electrocution | Potential fire | Potential electrocution or fire or burns | Potential crash |
| Fire | No or little synergistic effect - some smoke possible as well as burning or fire if amount of fire is sufficient | Burns/Potential Fire | Burns/Potential Fire | Burns/Potential Fire |
| Energy Blast | No synergistic effect - regular energy blast effect applies | No synergistic effect - regular energy blast effect applies | No synergistic effect - regular throwing effect applies | Potential crash |
| Punch | No synergistic effect - regular punch effect applies | No synergistic effect - regular punch effect applies | Affects the character as determined by collision detection and resolution - may be modified by victim | No synergistic effect - regular punch effect applies |

TABLE I-continued

LOOK-UP TABLE (PARTIAL) OF POTENTIALLY
SYNERGISTIC GAME/OBJECT AND A/V EFFECTS

| Type of Game Effect | Type of Object | | | |
|---|---|---|---|---|
| | Wet Object | Dry Object | Player or non-player character | Flying Object |
| Throwing | No synergistic effect - regular throwing effect applies | No synergistic effect - regular throwing effect applies | characteristics, e.g., armor, etc. No synergistic effect - regular throwing effect applies | No synergistic effect - regular throwing effect applies |
| Sonic Blast | No synergistic effect - regular sonic blast effect applies | No synergistic effect - regular sonic blast effect applies | May also cause a level of deafness | No synergistic effect - regular sonic blast effect applies |

TABLE II (PARTIAL) TABLE OF TRANSITIONS FROM
NON-PHYSICS OBJECT TO PHYSICS OBJECT

| Type of Game Effect | Type of non-physics object | | |
|---|---|---|---|
| | Generic Soft Geometry Object | Player or non-player character | Generic Hard Geometry Object |
| Light Damage | Movement, surface damage | Potential for movement | No transition to physics object |
| Medium Damage | Break apart, some transitioning to physics object of constituents, particles | Possible transition to physics object | No transition to physics object |
| Heavy Damage | Destruction, mostly particles, some transitioning of chunks to physics objects | Likely transition to physics object | No transition to physics object |
| Lightning | No transition to physics object | No transition to physics object | No transition to physics object |
| Fire | No transition to physics object | No transition to physics object | No transition to physics object |
| Energy Blast | Likely transition to physics object | Likely transition to physics object | No transition to physics object |
| Punch | Possible transition to physics object | Likely transition to physics object | No transition to physics object |
| Thrown Character | Likely transition to physics object | Likely transition to physics object | No transition to physics object |
| Sonic Blast | Likely transition to physics object | Likely transition to physics object | No transition to physics object |

The invention claimed is:

1. A non-transitory computer-readable medium, comprising instructions for causing a processor in an electronic device to perform a method of managing virtual 3-dimensional objects in a simulation, the method comprising:

a. defining a subset of virtual 3-dimensional objects in a simulation as physics objects;

b. defining at least a first basic parameter and a first state for a first of the physics objects, the first basic parameter characterized by a first value and a first type, the first state being selected from a group consisting of: mobile, immobile, undamaged, damaged, destroyed, or attached;

c. defining at least a second basic parameter and a second state for a second of the physics objects, the second basic parameter characterized by a second value and a second type, wherein the first type is different from the second type, the second state being selected from the group consisting of: mobile, immobile, undamaged, damaged, destroyed, or attached;

d. defining at least one synergistic interaction, caused by a trigger, between the first and second of the physics objects leading to an emergent result, the emergent result of the synergistic interaction at least in part dependent upon the first and second parameters and first and second states, wherein the trigger is selected from a group consisting of: a player character or non-player character affecting the first or second of the physics objects, a player character or non-player character interacting with the first or second of the physics objects, a player character or non-player character touching the first or second of the physics objects, a player character or non-player character damaging the first or second of the physics objects, a player character or non-player character picking up the first or second of the physics objects, a player character or non-player character throwing the first or second of the physics objects, or a predetermined scripted event;

e. subsequent to the at least one synergistic interaction, transitioning either the first or second physics object from the first or second respective state to a new state selected from the group consisting of: mobile, immobile, undamaged, damaged, destroyed, or attached, the new state different from the first or second respective state; and f. sending a signal to a renderer and rendering an indication of the result of the synergistic interaction for each of the first of the physics objects and the second of the physics objects.

2. The medium of claim 1, wherein the defining at least one synergistic interaction is caused by an occurrence of a collision being detected between the first and second objects.

3. The medium of claim 1, wherein the defining at least one synergistic interaction is caused by an occurrence of a collision being detected between either of the first or second objects and a projectile directed by a player character or non-player character.

4. The medium of claim 1, wherein the simulation is a massive multiplayer online game.

5. The medium of claim 1, wherein at least one of the first or second physics objects is a player character or a non-player character.

6. The medium of claim 1, further comprising defining at least one of the first or second physics objects as having a soft geometry, wherein if a state of a physics object having a soft geometry is damaged, further comprising replacing the physics object with at least two physics objects or a physics object and a non-physics object.

7. The medium of claim 1, further comprising defining at least one of the first or second physics objects as having a hard geometry, wherein if a state of a physics object having a hard geometry is damaged, further comprising rendering damage effects on the physics object having a hard geometry, and healing the damage over a period of time.

8. The medium of claim 1, wherein the first and second types are selected from the group consisting of: weight, size, shape, density, and conductivity.

9. The medium of claim 1, wherein the result of the synergistic interaction is determined by an object rule set or a look-up table.

10. The medium of claim 1, further comprising defining a physics object from one of the virtual 3-dimensional objects not previously defined as physics objects.

11. The medium of claim 10, wherein the defined physics object is a player character.

12. The medium of claim 10, wherein the defined physics object has a state defined as a weapon.

13. The medium of claim 1, wherein the defining at least one synergistic interaction includes defining at least one rule set, the rule set pertaining to physics objects having basic parameters with a common type.

14. The medium of claim 1, further comprising defining at least one game effect for at least one of the physics objects, wherein if a trigger occurs, the game effect occurs.

15. The medium of claim 1, further comprising defining at least one audio or visual effect for at least one of the physics objects, wherein if a trigger occurs, the audio or visual effect is rendered.

16. A non-transitory computer-readable medium, comprising instructions for causing a processor in an electronic device to perform a method of managing virtual 3-dimensional objects in a simulation, the method comprising:

a. defining a subset of virtual 3-dimensional objects in a simulation as physics objects;

b. defining at least a first basic parameter and a first state for a first of the physics objects, the first basic parameter characterized by a first value and a first type, the first state being selected from a group consisting of: mobile, immobile, undamaged, damaged, destroyed, or attached;

c. defining at least a second basic parameter and a second state for a second of the physics objects, the second basic parameter characterized by a second value and a second type;

d. defining at least one trigger, wherein the trigger is selected from a group consisting of: a player character or non-player character affecting the first of the physics objects, a player character or non-player character interacting with the first of the physics objects, a player character or non-player character touching the first of the physics objects, a player character or non-player character damaging the first of the physics objects, a player character or non-player character picking up the first of the physics objects, a player character or non-player character throwing the first of the physics objects, or a predetermined scripted event, wherein upon an occurrence of the trigger, transitioning at least one of the first of the physics objects and the second of the physics objects from the first state to a second state, or from the second state to the first state, respectively, the second state being selected from the group consisting of: mobile, immobile, undamaged, damaged, destroyed, or attached but different from the first state, a result of the transition emergent and at least in part dependent upon the first parameter and the first state or the second parameter and the second state; and e. sending a signal to a renderer and rendering an indication of the result of the transition and the first or second state.

17. The medium of claim 16, wherein the defining at least one trigger includes defining at least one trigger which may be caused by a player character, a non-player character, or a virtual object, and further comprising defining at least one qualifier on a trigger event, wherein the defining at least one qualifier includes defining which player characters, non-player characters, or virtual objects are allowed to cause a transition, or when transitions are allowed to occur.

18. The medium of claim 16, wherein the simulation is a massive multiplayer online game.

19. A non-transitory computer-readable medium, comprising instructions for causing a processor in an electronic device to perform a method of managing virtual 3-dimensional objects in a simulation, the method comprising:

a. defining at least one virtual 3-dimensional object in a simulation to be a non-physics object;

b. defining at least one trigger, wherein upon an occurrence of the trigger, transitioning the at least one virtual 3-dimensional object to be a physics object, such that the state of the object is changed from one state from a group consisting of: mobile, immobile, undamaged, damaged, destroyed, or attached, to a different one of the group, and wherein the trigger is selected from a group consisting of: a player character or non-player character affecting the non-physics object, a player character or non-player character interacting with the non-physics object, a player character or non-player character touching the non-physics object, a player character or non-player character damaging the non-physics object, a player character or non-player character picking up the non-physics object, a player character or non-player character throwing the non-physics object, or a predetermined scripted event; and c. sending a signal to a renderer and rendering an indication of the result of the transition.

20. The medium of claim 19, wherein the defining at least one trigger further includes defining at least one trigger which may be caused by a player character, a non-player character, or a virtual object, and further comprising defining at least one qualifier on the trigger, wherein the defining at least one qualifier includes defining which player characters, non-player characters, or virtual objects are allowed to cause a transition, or when transitions are allowed to occur.

21. The medium of claim 19, wherein the simulation is a massive multiplayer online game.

22. A non-transitory computer-readable medium comprising a system for managing virtual 3-dimensional objects in a simulation, the medium including the following modules:

a. a database module for storing data about a plurality of virtual objects including physics objects and non-physics objects; and b. a physics engine module including a trigger defining module for defining transitions in an object from being a physics object to being a non-physics object or from being a non-physics object to being a physics object, such that the state of the object is changed from one state from a group consisting of: mobile, immobile, undamaged, damaged, destroyed, or attached, to a different one of the group, and wherein the trigger defining module defines triggers selected from a group consisting of: a player character or non-player character affecting a physics or non-physics object, a player character or non-player character interacting with a physics or non-physics object, a player character or non-player character touching a physics or non-physics object, a player character or non-player character damaging a physics or non-physics object, a player character or non-player character picking up a physics or non-physics object, a player character or non-player character throwing a physics or non-physics object, or a predetermined scripted event.

23. A non-transitory computer-readable medium comprising a system for managing virtual 3-dimensional objects in a simulation, the medium including the following modules:

a. a database module for storing data about a plurality of virtual objects including physics objects, the physics objects in part defined by a state, the state selected from a group consisting of: mobile, immobile, undamaged, damaged, destroyed, or attached; and b. a physics engine module including:

i. an interaction defining module for defining synergistic interactions between physics objects or between physics objects and non-physics objects, the interactions caused by occurrence of a trigger, wherein the trigger is selected from a group consisting of: a player character or non-player character affecting a physics or non-physics object, a player character or non-player character interacting with a physics or non-physics object, a player character or non-player character touching a physics or non-physics object, a player character or non-player character damaging a physics or non-physics object, a player character or non-player character picking up a physics or non-physics object, a player character or non-player character throwing a physics or non-physics object, or a predetermined scripted event; and ii. an object rule set for defining an emergent result of a synergistic interaction between physics objects or between physics objects and non-physics objects, the emergent result including a transition from a first state to a second state, by at least one of the physics or non-physics objects, the second state also selected from the group consisting of: mobile, immobile, undamaged, damaged, destroyed, or attached but different from the first state.

24. The medium of claim 23, wherein the object rule set is a look-up table.

* * * * *